(12) United States Patent
Baick

(10) Patent No.: US 11,553,166 B2
(45) Date of Patent: Jan. 10, 2023

(54) METHOD, SYSTEM, AND NON-TRANSITORY COMPUTER READABLE RECORD MEDIUM FOR EXPOSING PERSONALIZED BACKGROUND USING CHROMA KEY IN BROADCAST VIEWING SIDE

(71) Applicant: LINE Plus Corporation, Seongnam-si (KR)

(72) Inventor: Joonsick Baick, Seongnam-si (KR)

(73) Assignee: LINE PLUS CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/106,502

(22) Filed: Nov. 30, 2020

(65) Prior Publication Data

US 2021/0084275 A1    Mar. 18, 2021

Related U.S. Application Data

(63) Continuation of application No. PCT/KR2018/006228, filed on May 31, 2018.

(51) Int. Cl.
*H04N 9/75* (2006.01)
*H04N 5/272* (2006.01)
*H04N 21/431* (2011.01)

(52) U.S. Cl.
CPC .............. *H04N 9/75* (2013.01); *H04N 5/272* (2013.01); *H04N 21/4312* (2013.01)

(58) Field of Classification Search
CPC ........................... H04N 5/272; H04N 21/4312
See application file for complete search history.

(56) References Cited

U.S. PATENT DOCUMENTS

| | | | |
|---|---|---|---|
| 2011/0008017 A1* | 1/2011 | Gausereide | G11B 27/036 386/280 |
| 2017/0374319 A1* | 12/2017 | Feng | H04N 7/15 |
| 2018/0262698 A1* | 9/2018 | Scharer, III | H04N 5/275 |
| 2018/0295324 A1* | 10/2018 | Clark | H04N 5/44504 |
| 2020/0302646 A1* | 9/2020 | Jeong | G06K 9/3233 |

FOREIGN PATENT DOCUMENTS

| | | |
|---|---|---|
| JP | H11-155134 A | 6/1999 |
| JP | H11-196404 A | 7/1999 |
| JP | 2002-152698 A | 5/2002 |
| JP | 2004-173320 A | 6/2004 |
| JP | 2016-509811 A | 3/2016 |

(Continued)

OTHER PUBLICATIONS

Office Action dated Jul. 19, 2022, issued in corresponding Japanese patent application No. 2020-567033.

*Primary Examiner* — Sumaiya A Chowdhury
(74) *Attorney, Agent, or Firm* — Harness, Dickey & Pierce, P.L.C.

(57) ABSTRACT

Disclosed is a broadcast providing method implemented at an electronic device including processing circuitry. The broadcast providing method includes receiving, by the processing circuitry, a broadcast image from a broadcast server, and generating, by the processing circuitry, a final image by synthesizing the broadcast image with a personalized background image using a chroma key, the personalized background image being personalized for a user of the electronic device.

21 Claims, 6 Drawing Sheets

(56) References Cited

FOREIGN PATENT DOCUMENTS

| KR | 200311511 Y1 | 5/2003 |
|---|---|---|
| KR | 10-2007-0048470 A | 5/2007 |
| KR | 100740775 B1 | 7/2007 |
| KR | 100852150 B1 | 8/2008 |
| KR | 101303279 B1 | 9/2013 |
| KR | 10-2013-0114475 A | 10/2013 |

\* cited by examiner

METHOD, SYSTEM, AND NON-TRANSITORY COMPUTER READABLE RECORD MEDIUM FOR EXPOSING PERSONALIZED BACKGROUND USING CHROMA KEY IN BROADCAST VIEWING SIDE

CROSS-REFERENCE TO RELATED APPLICATIONS

This U.S. non-provisional application is a continuation application of, and claims the benefit of priority under 35 U.S.C. § 365(c) to International Application No. PCT/KR2018/006228, filed May 31, 2018, the entire contents of which are incorporated herein by reference in their entirety.

TECHNICAL FIELD

At least one example embodiment relates to technology for providing a broadcast image using a chroma key.

RELATED ART

In general, a chroma key technique refers to a technique for creating a single video by synthesizing an image captured from a subject and a preset background image or image. The chroma key technique is used for image synthesis and refers to a technique that designates a specific chroma as a key and then replaces a pixel corresponding to the key in a main image with another image.

In the related art, a transmitting end transmits a uniform background image by applying a chroma key in advance. For example, technology exists for synthesizing an image captured through a camera and a background image using a chroma key technique and transmitting the synthesized image over a wired and wireless communication network.

SUMMARY

According to at least one example embodiment, each user viewing a corresponding broadcast may view the broadcast with a different background using a chroma key at each corresponding viewing end.

According to at least one example embodiment, a user may view a broadcast based on a background including personalized information content at a corresponding broadcast viewing end.

According to an aspect of at least one example embodiment, there is provided a broadcast providing method implemented at an electronic device including processing circuitry. The broadcast providing method includes receiving, by the processing circuitry, a broadcast image from a broadcast server, and generating, by the processing circuitry, a final image by synthesizing the broadcast image with a personalized background image using a chroma key, the personalized background image being personalized for a user of the electronic device.

The broadcast providing method may further include receiving, by the processing circuitry, the personalized background image from a background providing server associated with a broadcast service, the broadcast service being provided by the broadcast server.

The broadcast providing method may further include receiving, by the processing circuitry, a selected image from a background providing server as the personalized background image, the selected image being selected by the user of the electronic device, and the background providing server being associated with a broadcast service provided by the broadcast server.

The broadcast providing method may further include selecting, by the processing circuitry, a selected image stored in the electronic device as the personalized background image.

The broadcast providing method may further include receiving, by the processing circuitry, a selected image from a background providing server as the personalized background image, the selected image corresponding to a condition set by the user of the electronic device, and the background providing server being associated with a broadcast service provided by the broadcast server.

The broadcast providing method may further include receiving, by the processing circuitry, a selected image from a background providing server as the personalized background image, the selected image corresponding to information related to the user of the electronic device, and the background providing server being associated with a broadcast service provided by the broadcast server.

The broadcast providing method may further include receiving, by the processing circuitry, a first user image and a second user image from a background providing server as the personalized background image, the first user image being associated with the user of the electronic device, the second user image being associated with another user specified based on information related to the user of the electronic device, and the background providing server being associated with a broadcast service provided by the broadcast server.

The background providing server may be configured to acquire the first user image from the electronic device and the second user image from another electronic device of the other user, and the broadcast providing method may further include receiving, by the processing circuitry, a combined image from the background providing server as the personalized background image, the combined image being based on the first user image and the second user image.

The broadcast providing method may further include.

According to at least one example embodiment, the background providing server may store a plurality of background images including the personalized background image, each of the plurality of background images being associated with a respective targeting element, and the respective targeting element associated with the personalized background image corresponds to information related to the user of the electronic device.

According to an aspect of at least one example embodiment, there is provided a non-transitory computer-readable record medium storing instructions that, when executed by processing circuitry, cause the processing circuitry to implement the broadcast providing method.

According to an aspect of at least one example embodiment, there is provided an electronic device including processing circuitry configured to receive a broadcast image from a broadcast server, and generate a final image by synthesizing the broadcast image with a personalized background image using a chroma key, the personalized background image being personalized for a user of the electronic device.

Further areas of applicability will become apparent from the description provided herein. The description and specific examples in this summary are intended for purposes of illustration only and are not intended to limit the scope of the present disclosure.

DETAILED DESCRIPTION

At least one example embodiment will be described in detail with reference to the accompanying drawings. At least one example embodiment, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to at least one example embodiment. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which at least one example embodiment belongs. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned herein. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, at least one example embodiment may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of at least one example embodiment may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, at least one example embodiment will be described with reference to the accompanying drawings.

At least one example embodiment relates to technology for providing an image using a chroma key, and more particularly, to technology for displaying a personalized background using a chroma key at a broadcast viewing end.

At least one example embodiment may provide a personalized background using a chroma key at a broadcast viewing end and, accordingly, may achieve many advantages in terms of a personal service, information targeting, a fun element, efficiency, and convenience.

Figure 1:
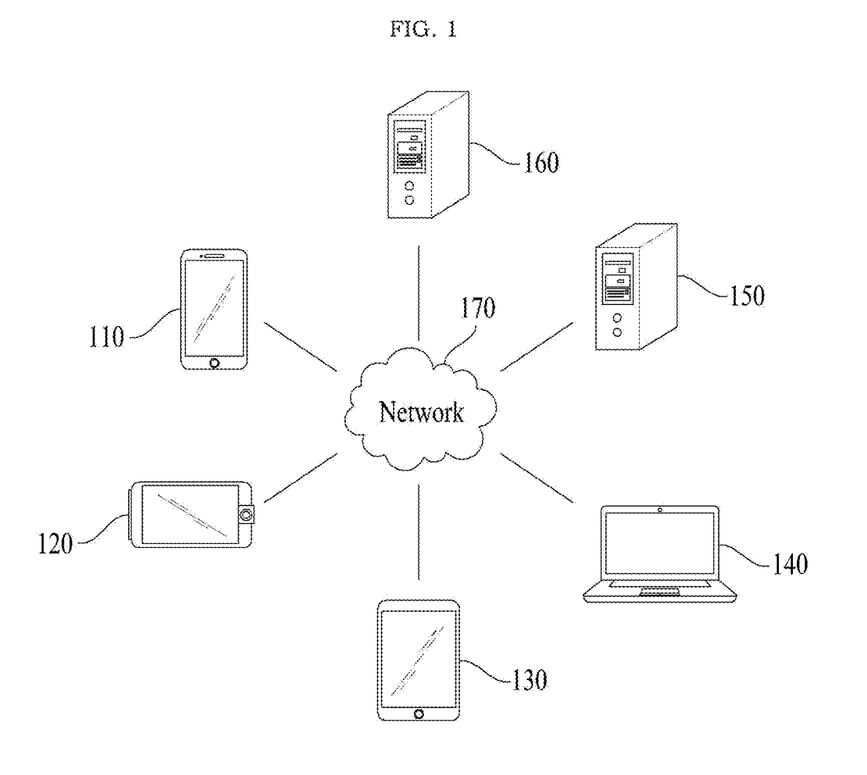
FIG. 1 is a diagram illustrating an example of a network environment according to at least one example embodiment.

FIG. 1 illustrates an example of a network environment according to at least one example embodiment. Referring to FIG. 1, the network environment may include a plurality of electronic devices 110, 120, 130, and/or 140, a plurality of servers 150 and/or 160, and/or a network 170. FIG. 1 is provided as an example only. A number of electronic devices or a number of servers is not limited thereto.

Each of the plurality of electronic devices 110, 120, 130, and/or 140 may be a fixed terminal or a mobile terminal that is configured as a computer system. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and/or the like. For example, although FIG. 1 illustrates a shape of a smartphone as an example of the electronic device 110, the electronic device 110 used herein may refer to one of various types of physical computer systems capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and/or 140 over the network 170. For example, the server 150 may be a system that provides a first service to the plurality of electronic devices 110, 120, 130, and/or 140 connected over the network 170. The server 160 may be a system that provides a second service to the plurality of electronic devices 110, 120, 130, and/or 140 connected over the network 170. In detail, the server 150 may provide, as the first service, a service (e.g., a broadcast service) intended (e.g., requested) by an application, the application may be a computer program installed and executed on the plurality of electronic devices 110, 120, 130, and/or 140. As another example, the server 160 may provide, as the second service, a service that distributes a file for installing and executing the application to the plurality of electronic devices 110, 120, 130, and/or 140.

Figure 2:
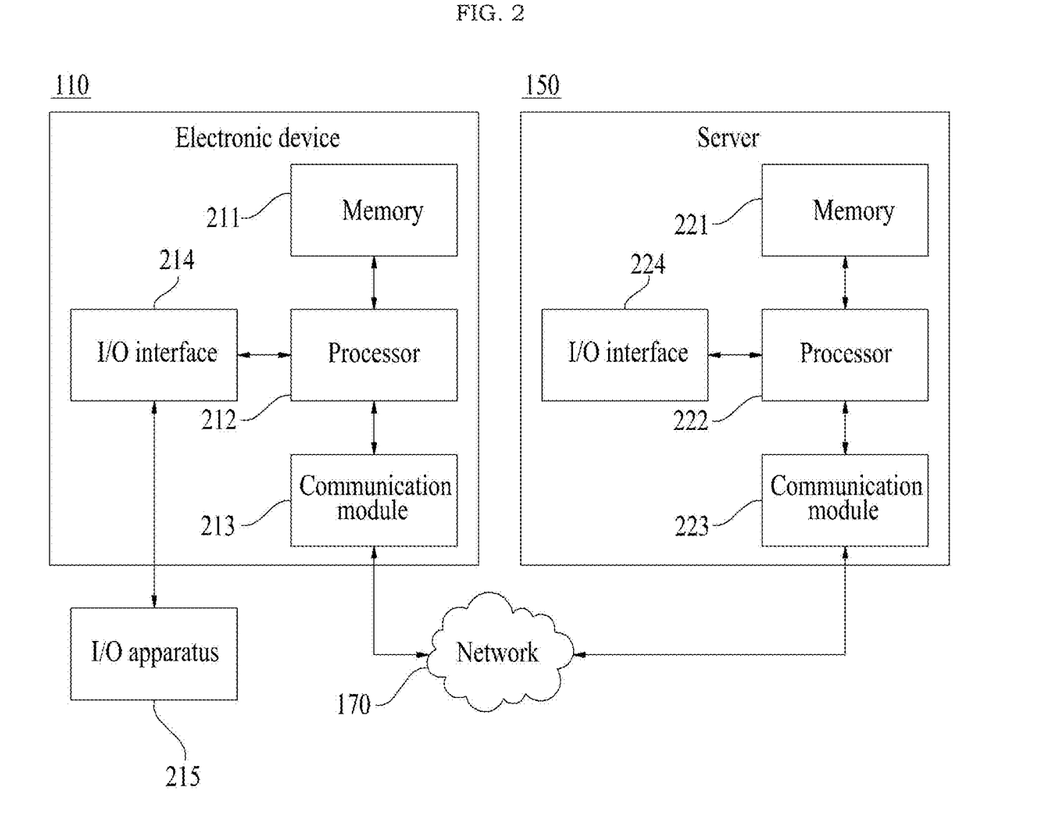
FIG. 2 is a diagram illustrating an example of an electronic device and a server according to at least one example embodiment.

FIG. 2 is a block diagram illustrating an example of an electronic device and a server according to at least one example embodiment. Description is made using the electronic device 110 as an example of an electronic device and the server 150 as an example of a server with reference to FIG. 2. Also, the other electronic devices 120, 130, and/or 140, and/or the server 160, may have the same or a similar configuration as that of the electronic device 110 or the server 150.

Referring to FIG. 2, the electronic device 110 may include a memory 211, a processor 212, a communication module 213, and/or an input/output (I/O) interface 214, and the server 150 may include a memory 221, a processor 222, a communication module 223, and/or an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as the ROM, SSD, flash memory, and/or disk drive, may be included in the electronic device 110 or the server 150 as a permanent storage device separate from the memory 211, 221. Also, an OS and at least one program code, for example, a code for a browser installed and executed on the electronic device 110, or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to at least one example embodiment, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170, and may provide a function for communication between the electronic device 110 and/or the server 150 and another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O apparatus 215 (e.g., an input device and/or an output device). For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the electronic device 110. Also, the I/O interface 224 of the server 150 may be a device for interface with an apparatus (not shown) for input or output that may be connected to the server 150 or included in the server 150. In detail, when the processor 212 of the electronic device 110 processes an instruction of a computer program loaded to the memory 211, content or a service screen configured based on data provided from the server 150 or the electronic device 120 may be displayed on the display through the I/O interface 214.

According to at least one example embodiment, the electronic device 110 and the server 150 may include a number of components greater than or less than a number of components shown in FIG. 2. However, some components according to the related art are not illustrated in detail. For example, the electronic device 110 may include at least a portion of the I/O apparatus 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, at least one example embodiment of a method and system for displaying a personalized background using a chroma key at a broadcast viewing end are described.

In the related art, since a transmitting end applies a chroma key in advance and transmits a broadcast image with a uniform background, all of the users may view a broadcast with the same background or a similar background.

Herein, provided is a function that allows a broadcast viewing end to view a broadcast based on a personalized background.

Figure 3:
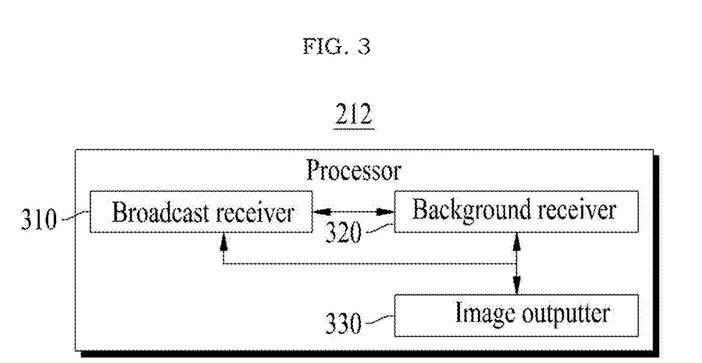
FIG. 3 is a diagram illustrating an example of components includable in a processor of an electronic device according to at least one example embodiment.
Figure 4:
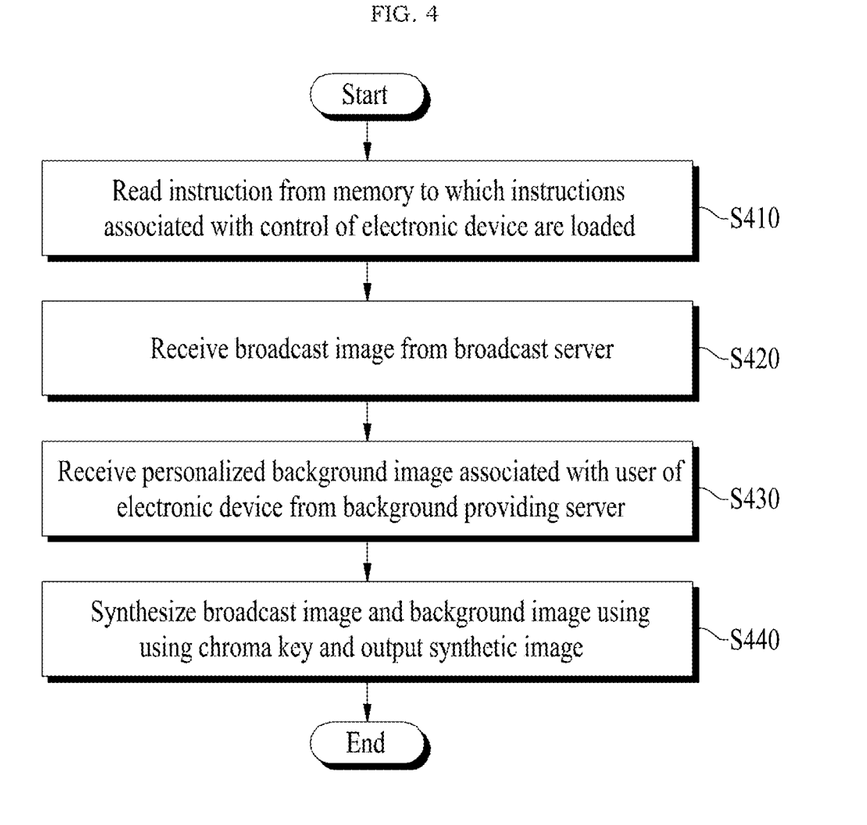
FIG. 4 is a flowchart illustrating an example of a method performed by an electronic device according to at least one example embodiment.

FIG. 3 is a diagram illustrating an example of components includable in a processor of an electronic device according to at least one example embodiment, and FIG. 4 is a flowchart illustrating an example of a method performed by an electronic device according to at least one example embodiment.

A computer-implemented broadcast providing system may be configured in the electronic device 110 according to at least one example embodiment. For example, the broadcast providing system may be implemented in an independently operating program form or in an in-app form of a specific application to be operable on the specific application. In at least one example embodiment, the broadcast providing system may provide a broadcast service through interaction with the server 150.

The broadcast providing system implemented in the electronic device 110 may perform a broadcast providing method of FIG. 4 in response to an instruction provided from an application installed on the electronic device 110.

To perform the broadcast providing method of FIG. 4, the processor 212 of the electronic device 110 may include a broadcast receiver 310, a background receiver 320, and/or an image outputter 330. According to at least one example embodiment, the components of the processor 222 may be selectively included in or excluded from the processor 212. Also, according to at least one example embodiment, the components of the processor 212 may be separated or merged for representations of functions of the processor 212.

The processor 212 and/or the components of the processor 212 may control the electronic device 110 to perform operations S410 to S440 included in the broadcast providing method of FIG. 4. For example, the processor 212 and/or the components of the processor 212 may be configured to execute an instruction according to a code of at least one program and/or a code of an OS included in the memory 211.

Here, the components of the processor 212 may be representations of different functions of the processor 212 performed by the processor 212 in response to an instruction provided from the program code stored in the electronic device 110, for example, an instruction provided from an application executed on the electronic device 110. For example, the broadcast receiver 310 may be used as a functional representation of the processor 212 that controls the electronic device 110 to receive a broadcast image in response to the instruction.

Referring to FIG. 4, in operation S410, the processor 212 may read an instruction from the memory 211 to which instructions associated with control of the electronic device 110 are loaded. In this case, the read instruction may include an instruction for controlling the processor 212 to perform the following operations S420 to S440.

In operation S420, the broadcast receiver 310 may receive a broadcast image from a broadcast server (e.g., the server 150 and thus, also referred to as the broadcast server 150) that provides a broadcast service. Here, the broadcast image may refer to image content acquired by capturing a subject, for example, a show host, with an imaging device in front of (e.g., foreground) a chroma key enabled background. A broadcast server 150 may transmit the broadcast image with the chroma key enabled background, acquired through the imaging device, to the electronic device 110. That is, the broadcast image may be transmitted from a broadcast transmitting end to a broadcast viewing end, that is, to the electronic device 110 from the broadcast server 150 without a separate chroma key.

In operation S430, the background receiver 320 may receive a personalized background image associated with a user of the electronic device 110 from a background providing server (e.g., the server 160 and thus, also referred to as the background providing server 160) that provides a personalized background in association with the broadcast service. The background providing server 160 may function as a background platform to provide the broadcast image and the chroma key enabled background image, and may be configured as a single system with the broadcast server 150 (e.g., as a component include in the broadcast server 150) or a separate system (e.g., a separate system that interworks with the broadcast server 150 through a network), and may provide the background image for the broadcast image through interaction with the broadcast server 150. Here, the background image may be image content created as a moving picture and/or an image. For example, the background receiver 320 may receive a background image selected by the user of the electronic device 110 from the background providing server 160. As another example, the background receiver 320 may receive a background image corresponding to a condition preset or alternatively, given by the user of the electronic device 110 from the background providing server 160. As another example, the background receiver 320 may receive a personalized background image from the background providing server 160 based on Internet information related to the user of the electronic device 110. That is, the background providing server 160 may provide the background image selected by the user of the electronic device 110, the background image corresponding to the preset or given condition, and/or the background image specified based on information (e.g., Internet information) related to the user of the electronic device 110 as the personalized background image for the user of the electronic device 110. When transferring a service request from the broadcast receiver 310 to the broadcast server 150, the background receiver 320 may access the background providing server 160 and may receive the personalized background image for the user of the electronic device 110.

In operation S440, the image outputter 330 may synthesize the broadcast image received from the broadcast server 150 and the background image received from the background providing server 160 using a chroma key, and may output the synthetic image as a final image. The image outputter 330 may acquire the synthetic image by designating a background color of the broadcast image as a key and then replacing a pixel of the corresponding key in the broadcast image with the background image. According to at least one example embodiment, the image outputter 330 may replace many or all of the pixels of the corresponding key in the broadcast image with corresponding pixels of the background image. The image outputter 330 may chroma-key the broadcast image and the background image (e.g., the image outputter 330 may generate a final image by synthesizing the broadcast image with the background image), and may output the chroma-keyed result through an output device of the electronic device 110, for example, a display of a broadcast viewing end. The electronic device 110 may chroma-key the broadcast image received from the broadcast server 150 and the background image received from the background providing server 160, and may output the same through a display. A function that allows a viewer, for example, the user of the electronic device 110 to view the broadcast image based on a personalized background is provided. Through this, the personalized background image may be provided to an individual of a viewing end. Alternatively, the viewer may be allowed to select the background image and to view the selected background image with the broadcast image.

Figure 5:
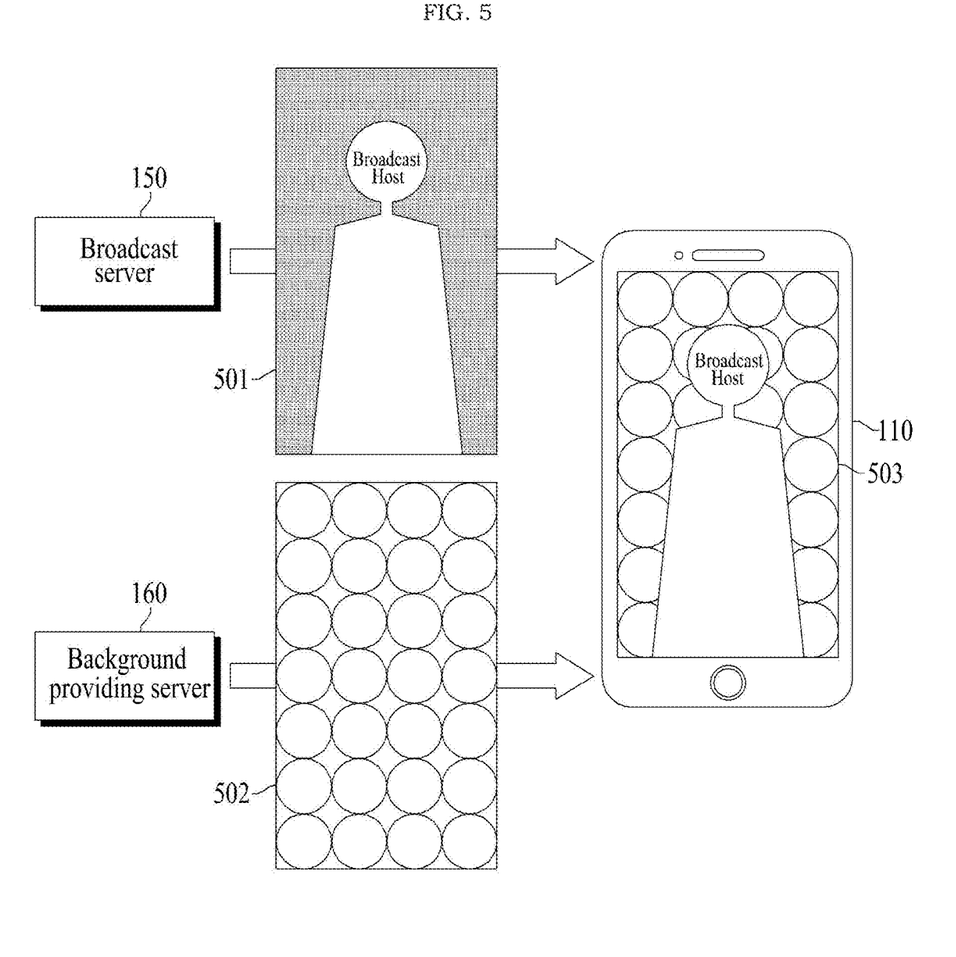
FIG. 5 illustrates an example of a process of synthesizing a broadcast image and a background image using a chroma key according to at least one example embodiment.

FIG. 5 illustrates an example of a process of synthesizing a broadcast image and a background image using a chroma key according to at least one example embodiment.

Referring to FIG. 5, in a process of receiving a broadcast image 501 from the broadcast server 150, a broadcast viewing end, that is, the electronic device 110 may receive a background image 502 from the background providing server 160. Here, the broadcast image 501 may be an image or a moving picture captured in a chroma key enabled background instead of being transmitted through application of a chroma key. The background image 502 may also be configured as a moving picture as well as an image, and may include information content that may be personalized for the user of the electronic device 110. For example, the information content may include a variety of additional information related to advertising content or broadcast. If the broadcast server 150 broadcasts a live quiz show, the background providing server 160 may provide the background image 502 that includes at least one piece of information content, such as, for example, interstitial advertising (e.g., targeted advertising), a quiz explanation, and/or a quiz hint.

The electronic device 110 may synthesize the broadcast image 501 and the background image 502 using a chroma key, and then may output a synthetic image 503 on a screen of the electronic device 110 as a final image. Therefore, instead of transmitting a broadcast by applying the chroma key in advance at a broadcast transmitting end, the broadcast viewing end may individually receive the broadcast image 501 and the background image 502, and may synthesize the background image 502 and the broadcast image 501 using the chroma key and thereby may view the broadcast in a background optimized, personalized and/or improved for the individual viewer.

For example, the background image 502 may be selectively personalized by the user of the electronic device 110. In response to an access (e.g., request) from the electronic device 110, the background providing server 160 may provide a background image list on a background platform to the electronic device 110 and may transmit a background image selected from the background image list to the electronic device 110 as the personalized background image 502. According to at least one example embodiment, the background image list includes background images stored on the background providing server 160 that are available for selection as the personalized background image 502.

Here, if a background image selection is delayed, the background providing server 160 may initially provide a default image and, in response to a completion of the selection from the user of the electronic device 110, may provide the selected background image. Therefore, the electronic device 110 may provide the background image selected by the user as a background of the broadcast image 501. In addition to the background image 502 provided from the background providing server 160, the user may be allowed to select an image stored in a local area of the electronic device 110 (e.g., an image stored on the electronic device 110) and to apply the selected image as the background image 502.

The background providing server 160 may provide a function of sharing a background image between users. That is, the background providing server 160 may provide a background image selected by the user to another user in response to a sharing request from the user or may provide a background image selected by the other user to the user in response to a sharing request from the other user, based on a social relationship between the user and the other user through interaction with the broadcast server 150 or another server, for example, a messenger and a social network service (SNS). According to at least one example embodiment, the background providing server 160 may receive a request from a first user A that includes a background image 502 selected by the first user A and information of a second user B who is a friend of the first user A. The background providing server 160 may identify the second user B based on the information of the second user B received from the first user A, and the background image 502 may be delivered to the second user B.

As another example, the background image 502 may be preset or alternatively, given by the user of the electronic device 110. A condition about a background image the user desires to synthesize with the broadcast image 501 may be preset or alternatively, given by the user of the electronic device 110. In response to an access (e.g., request) from the electronic device 110, the background providing server 160 may transmit a background image corresponding to the condition preset or alternatively, given by the user of the electronic device 110 among background images on the background platform to the electronic device 110 as the personalized background image 502. Information or management data included in metadata of a corresponding background image, such as, for example, a keyword (hashtag), a category, freshness, and/or popularity, may be used as the preset or alternatively, given condition. For example, if the user sets a condition, such as "popular dog photo," the background providing server 160 may automatically select a most popular photo from among photos of "dog" and may transmit the selected photo to the electronic device 110 in response to an access from the electronic device 110. Accordingly, the electronic device 110 may provide the background image 502 corresponding to the preset or alternatively, given condition of the user as a background of the broadcast image 501.

As another example, the background image 502 may be personalized based on information (e.g., Internet information, user profile information, etc.) related to the user of the electronic device 110. The background providing server 160 may transmit, to the electronic device 110 as the personalized background image 502, a background image corresponding to user related information among background images on the background platform based on information included in metadata of a corresponding background image. For example, a landmark image corresponding to a location of the user of the electronic device 110 may be provided as the background image 502. Also, the background image 502 may include information content that includes a targeting element and the background providing server 160 may transmit, to the electronic device 110 as the personalized background image 502, a background image in which the targeting element corresponds to information related to the user of the electronic device 110. According to at least one example embodiment, the targeting element of a background image may correspond to a target user to be provided with the background image 502. For example, the target of the background image 502 may be set based on age, gender, location, interest, etc. In detail, the background providing server 160 may collect a user profile (an age, a gender, a location, interest, etc.), a search history, a content consumption history, and/or a shopping history, as information related to the user of the electronic device 110 through interaction with the broadcast server 150 or another server (not shown), may automatically select a background image corresponding to the information (e.g., based on the metadata and/or targeting element of the background images) and may transmit the selected background image to the electronic device 110. Accordingly, the electronic device 110 may provide the background image 502 targeted for the individual user as a background of the broadcast image 501 based on information related to the user of the electronic device 110.

Figure 6:
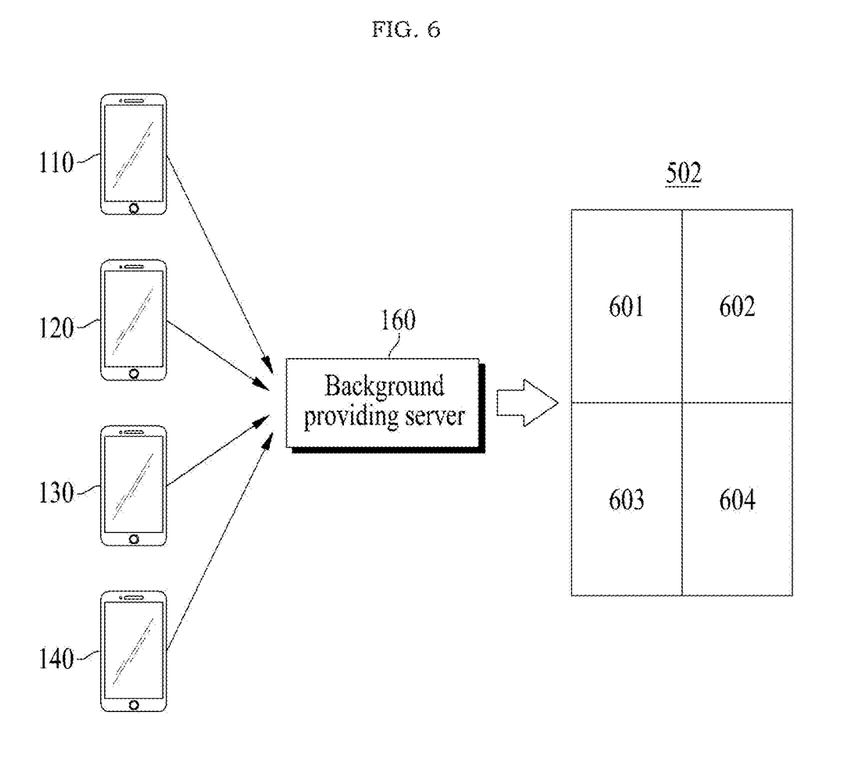
FIG. 6 illustrates an example of describing a process of creating a personalized background image according to at least one example embodiment.

As another example, the background image 502 may be personalized based on an image associated with at least one another user specified based on a social relationship with the user of the electronic device 110. The background providing server 160 may verify a social relationship of the user of the electronic device 110 through interaction with the broadcast server 150 or another server, for example, a messenger and/or an SNS, may combine an image of another user having a social relationship with the user of the electronic device 110 among users using a current broadcast service based on the verified social relationship, and may provide the combined image to the user of the electronic device 110 as the personalized background image 502. Referring to FIG. 6, with the assumption that users of the electronic devices 120, 130, and 140 have a social relationship with the user of the electronic device 110, the background providing server 160 may acquire current camera images 601, 602, 603, and 604 from the electronic devices 110, 120, 130, and 140, respectively, may combine the four camera images 601, 602, 603, and 604 into a single image, and may transmit the combined image to the electronic device 110 as the personalized background image 502. Instead of using the camera images 601, 602, 603, and 604 acquired from the electronic devices 110, 120, 130, and 140, the background image 502 may be created using profile photos preset or alternatively, given on a service platform by the users of the electronic devices 110, 120, 130, and 140. In addition, or alternatively, to the social relationship, an image associated with at least one other user specified based on the user profile (e.g., an age, a gender, a location, and/or interest) of the electronic device 110 may be used. For example, the personalized background image 502 may be created for and provided to the user of the electronic device 110 using an image of another user present within a predetermined (or, alternatively, desired) radius based on a location of the user of the electronic device 110 or an image of another user having the same interest as, or a similar interest to, that of the user of the electronic device 110. That is, the background providing server 160 may create and provide the personalized background image 502 using images of users having the same or a similar condition by region, interest, gender, age, and/or the like.

As described above, according to at least one example embodiment, each user viewing a corresponding broadcast may view the broadcast with a different background using a chroma key at each corresponding viewing end.

According to at least one example embodiment, operations described herein as being performed by the electronic device 110, the processor 212, the server 150, the processor 222, the broadcast receiver 310, the background receiver 320 and/or the image outputter 330 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Conventional devices and methods for applying a background image to another image include combining the background and other image to form a combined image and, subsequently, broadcasting the combined image to a plurality of viewers. Accordingly, all of the viewers of the broadcasted combined image view the same background image. Thus, the conventional devices and methods provide insufficient opportunities for personalization of the background image.

According to at least one example embodiment, improved devices and methods are provided for personalizing a background image applied to a broadcast image. For example, according to at least one example embodiment, a broadcast image is received by an electronic device of a user and a personalized background image is synthesized with the received broadcast image. Accordingly, the improved devices and methods of at least one example embodiment overcome the deficiencies of the conventional devices and methods to enable personalization of a background image applied to a broadcasted image, thereby enhancing the entertainment value of the broadcast, providing opportunities for serving content targeted to a particular user, etc.

The systems or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently, or collectively, instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The above-described methods according to at least one example embodiment may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed by Appstore that distributes applications or a site, a server, and the like that supplies and distributes other various types of software. Examples of program instructions include both machine code, such as produced by a compiler, and files containing higher level code that may be executed by the computer using an interpreter.

While this disclosure includes at least one example embodiment, it will be apparent to one of ordinary skill in the art that various alterations and modifications in form and details may be made in without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A broadcast providing method implemented at an electronic device comprising processing circuitry, the broadcast providing method comprising:
   receiving, by the processing circuitry, a broadcast image from a broadcast server; and
   generating, by the processing circuitry, a first final image by synthesizing the broadcast image with a first personalized background image using a chroma key, the first personalized background image being personalized for a user of the electronic device, the first personalized background image including a first user image and a second user image, the first user image being associated with the user of the electronic device, the second user image being associated with another user specified based on information related to the user of the electronic device, and the information related to the user of the electronic device including social relationship information corresponding to a social network service.

2. The broadcast providing method of claim 1, further comprising:
   receiving, by the processing circuitry, the first personalized background image from a background providing server associated with a broadcast service, the broadcast service being provided by the broadcast server.

3. The broadcast providing method of claim 2, wherein the broadcast providing method further comprising generating, by the processing circuitry, a seventh final image by synthesizing the broadcast image with a seventh personalized background image using the chroma key, the seventh personalized background image being personalized for the user of the electronic device; and
   the background providing server stores a plurality of background images including the seventh personalized background image, each of the plurality of background images being associated with a respective targeting element; and
   the respective targeting element associated with the seventh personalized background image corresponds to information related to the user of the electronic device.

4. The broadcast providing method of claim 1, further comprising:
   generating, by the processing circuitry, a second final image by synthesizing the broadcast image with a second personalized background image using the chroma key, the second personalized background image being personalized for the user of the electronic device; and
   receiving, by the processing circuitry, a selected image from a background providing server as the second personalized background image, the selected image being selected by the user of the electronic device, and the background providing server being associated with a broadcast service provided by the broadcast server.

5. The broadcast providing method of claim 1, further comprising:
   generating, by the processing circuitry, a third final image by synthesizing the broadcast image with a third personalized background image using the chroma key, the third personalized background image being personalized for the user of the electronic device; and
   selecting, by the processing circuitry, a selected image stored in the electronic device as the third personalized background image.

6. The broadcast providing method of claim 1, further comprising:
   generating, by the processing circuitry, a fourth final image by synthesizing the broadcast image with a fourth personalized background image using the chroma key, the fourth personalized background image being personalized for the user of the electronic device; and
   receiving, by the processing circuitry, a selected image from a background providing server as the fourth personalized background image, the selected image corresponding to a condition set by the user of the electronic device, and the background providing server being associated with a broadcast service provided by the broadcast server.

7. The broadcast providing method of claim 1, further comprising:
generating, by the processing circuitry, a fifth final image by synthesizing the broadcast image with a fifth personalized background image using the chroma key, the fifth personalized background image being personalized for the user of the electronic device; and
receiving, by the processing circuitry, a selected image from a background providing server as the fifth personalized background image, the selected image corresponding to information related to the user of the electronic device, and the background providing server being associated with a broadcast service provided by the broadcast server.

8. The broadcast providing method of claim 1, wherein the broadcast providing method further comprises receiving, by the processing circuitry, the first personalized background image from a background providing server associated with a broadcast service, the broadcast service being provided by the broadcast server;
the background providing server is configured to acquire the first user image from the electronic device and the second user image from another electronic device of the other user; and
the broadcast providing method further comprises receiving, by the processing circuitry, a combined image from the background providing server as the first personalized background image, the combined image being based on the first user image and the second user image.

9. The broadcast providing method of claim 1, further comprising:
generating, by the processing circuitry, a sixth final image by synthesizing the broadcast image with a sixth personalized background image using the chroma key, the sixth personalized background image being personalized for the user of the electronic device; and
receiving, by the processing circuitry, a selected image from a background providing server as the sixth personalized background image, the selected image being determined based on a request from another user associated with the user of the electronic device, and the background providing server being associated with a broadcast service provided by the broadcast server.

10. The broadcast providing method of claim 1, further comprising:
generating, by the processing circuitry, a second final image by synthesizing the broadcast image with a second personalized background image using the chroma key, the second personalized background image being personalized for the user of the electronic device, the second personalized background image being selected by the user of the electronic device.

11. The broadcast providing method of claim 1, wherein the first user image or the second user image is a profile image corresponding to the social network service.

12. A non-transitory computer-readable record medium storing instructions that, when executed by the processing circuitry, cause the processing circuitry to implement the broadcast providing method of claim 1.

13. An electronic device comprising:
processing circuitry configured to
receive a broadcast image from a broadcast server, and
generate a first final image by synthesizing the broadcast image with a first personalized background image using a chroma key, the first personalized background image being personalized for a user of the electronic device, the first personalized background image including a first user image and a second user image, the first user image being associated with the user of the electronic device, the second user image being associated with another user specified based on information related to the user of the electronic device, and the information related to the user of the electronic device including social relationship information corresponding to a social network service.

14. The electronic device of claim 13, wherein the processing circuitry is configured to:
receive the first personalized background image from a background providing server associated with a broadcast service, the broadcast service being provided by the broadcast server.

15. The electronic device of claim 14, wherein
the processing circuitry is configured to generate a seventh final image by synthesizing the broadcast image with a seventh personalized background image using the chroma key, the seventh personalized background image being personalized for the user of the electronic device;
the background providing server stores a plurality of background images including the seventh personalized background image, each of the plurality of background images being associated with a respective targeting element; and
the respective targeting element associated with the seventh personalized background image corresponds to information related to the user of the electronic device.

16. The electronic device of claim 13, wherein the processing circuitry is configured to:
generate a second final image by synthesizing the broadcast image with a second personalized background image using the chroma key, the second personalized background image being personalized for the user of the electronic device; and
receive a selected image from a background providing server as the second personalized background image, the selected image being selected by the user of the electronic device, and the background providing server being associated with a broadcast service provided by the broadcast server.

17. The electronic device of claim 13, wherein the processing circuitry is configured to:
generate a third final image by synthesizing the broadcast image with a third personalized background image using the chroma key, the third personalized background image being personalized for the user of the electronic device; and
select a selected image stored in the electronic device is selected as the third personalized background image.

18. The electronic device of claim 13, wherein the processing circuitry is configured to:
generate a fourth final image by synthesizing the broadcast image with a fourth personalized background image using the chroma key, the fourth personalized background image being personalized for the user of the electronic device; and
receive a selected image from a background providing server as the fourth personalized background image, the selected image corresponding to a condition set by the user of the electronic device, and the background providing server being associated with a broadcast service provided by the broadcast server.

19. The electronic device of claim 13, wherein processing circuitry is configured to:

generate a fifth final image by synthesizing the broadcast image with a fifth personalized background image using the chroma key, the fifth personalized background image being personalized for the user of the electronic device; and receive a selected image from a background providing server as the fifth personalized background image, the selected image corresponding to information related to the user of the electronic device, and the background providing server being associated with a broadcast service provided by the broadcast server.

20. The electronic device of claim 13, wherein the processing circuitry is configured to:

generate a sixth final image by synthesizing the broadcast image with a sixth personalized background image using the chroma key, the sixth personalized background image being personalized for the user of the electronic device; and receive a selected image from a background providing server as the sixth personalized background image, the selected image being determined based on a request from another user associated with the user of the electronic device, and the background providing server being associated with a broadcast service provided by the broadcast server.

21. The electronic device of claim 13, wherein the first user image or the second user image is a profile image corresponding to the social network service.

\* \* \* \* \*